United States Patent
Li et al.

(10) Patent No.: US 10,783,128 B2
(45) Date of Patent: Sep. 22, 2020

(54) RULE BASED DATA PROCESSING

(71) Applicant: INTERNATIONAL BUSINESS MACHINES CORPORATION, Armonk, NY (US)

(72) Inventors: Guo Qiang Li, Beijing (CN); June-Ray Lin, Taipei (TW); Chih-Hsiung Liu, Taipei (TW); Hao-Ting Shih, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 15/648,618

(22) Filed: Jul. 13, 2017

(65) Prior Publication Data

US 2019/0018867 A1    Jan. 17, 2019

(51) Int. Cl.
| | |
|---|---|
| *G06F 16/22* | (2019.01) |
| *G06F 16/951* | (2019.01) |
| *G06Q 30/00* | (2012.01) |
| *G06F 21/64* | (2013.01) |
| *G06Q 10/06* | (2012.01) |

(Continued)

(52) U.S. Cl.
CPC .......... *G06F 16/22* (2019.01); *G06F 16/951* (2019.01); *G06F 21/64* (2013.01); *G06Q 10/06* (2013.01); *G06Q 10/10* (2013.01); *G06Q 30/00* (2013.01); *H04L 67/42* (2013.01)

(58) Field of Classification Search
CPC ........ G06F 16/22; G06F 16/951; G06F 21/64; H04L 67/42; G06Q 10/06; G06Q 10/10; G06Q 30/00
See application file for complete search history.

(56) References Cited

U.S. PATENT DOCUMENTS

| | | | |
|---|---|---|---|
| 8,112,500 B2 * | 2/2012 | Saito | G06F 8/60 |
| | | | 709/218 |
| 9,298,806 B1 | 3/2016 | Vessenes et al. | |
| 2015/0087407 A1 | 3/2015 | Hate | |

(Continued)

FOREIGN PATENT DOCUMENTS

| | | |
|---|---|---|
| WO | 2014071290 A1 | 5/2014 |
| WO | 2015175722 A1 | 11/2015 |

OTHER PUBLICATIONS

Institute of International Finance, "Banking on the Blockchain Reengineering the Financial Architecture", Nov. 16, 2015, pp. 1-16.

(Continued)

*Primary Examiner* — Irete F Ehichioya
*Assistant Examiner* — Xiaoqin Hu
(74) *Attorney, Agent, or Firm* — Robert C. Bunker

(57) ABSTRACT

A computer-implemented method and a computer system are proposed. According to the method, content and a rule are obtained. The rule specifies a condition associated with the content and an action to be performed if the condition is satisfied. A profile, instructions and chain code are determined at least based on the rule. The profile is used for recording a result of the action. The instructions are used for monitoring whether the condition is satisfied and for updating the profile. The chain code is used for operating a blockchain. In response to the condition being satisfied, the profile is updated and the updated profile is stored in association with the content and the rule into the blockchain by the chain code.

13 Claims, 8 Drawing Sheets

(51) Int. Cl.
*H04L 29/06* (2006.01)
*G06Q 10/10* (2012.01)

(56) References Cited

U.S. PATENT DOCUMENTS

| | | |
|---|---|---|
| 2015/0324764 A1 | 11/2015 | Van Rooyen et al. |
| 2015/0332283 A1* | 11/2015 | Witchey ............... G06Q 30/018 705/3 |
| 2018/0101906 A1* | 4/2018 | McDonald ............. G06Q 40/04 |
| 2018/0218003 A1* | 8/2018 | Banga ................... G06F 16/137 |
| 2018/0322588 A1* | 11/2018 | Linne ................... G06Q 40/125 |
| 2019/0013932 A1* | 1/2019 | Maino ................... H04L 9/0637 |

OTHER PUBLICATIONS

Mell et al., "The NIST Definition of Cloud Computing", Recommendations of the National Institute of Standards and Technology, National Institute of Standards and Technology, Special Publication 800-145, Sep. 2011, pp. 1-7.

* cited by examiner

RULE BASED DATA PROCESSING

BACKGROUND

The present invention relates generally to the field of data processing, and more particularly to rule based data processing.

Different parties, such as individuals, companies, organizations or other entities, usually have their own databases for recording of objects of interest, such as assets, documents, goods or the like, among parties. Each party keeps their own records and periodically checks with each other whether the records are consistent with each other. Because of different data format, schema and synchronization frequencies and even errors, it is demanding for all the parties to reach consensus in all cases. Another way to organize cross-organization activities involves choosing one party among the plurality of parties to keep all records, or finding an independent third party to store all records. However, in these centralized solutions, the party acting as the central management party is susceptible to be attacked. Thus, it is challenging to dynamically control and indisputably keep track of the objects across the different parties.

SUMMARY

According to one embodiment of the present invention, there is provided a computer-implemented method. According to the method, content and a rule are obtained. The rule specifies a condition associated with the content and an action to be performed if the condition is satisfied. A profile, instructions and chain code are determined at least based on the rule. The profile is used for recording a result of the action. The instructions are used for monitoring whether the condition is satisfied and for updating the profile. The chain code is used for operating a blockchain. In response to the condition being satisfied, the profile is updated and the updated profile is stored in association with the content and the rule into the blockchain by the chain code.

According to another embodiment of the present invention, there is provided a computer system. The computer system includes one or more processors. The one or more processors are configured to obtain content and a rule. The rule specifies a condition associated with the content and an action to be performed if the condition is satisfied. The one or more processors are configured to determine a profile, instructions and chain code at least based on the rule. The profile is used for recording a result of the action. The instructions are used for monitoring whether the condition is satisfied and for updating the profile. The chain code is used for operating a blockchain. The one or more processors are configured to, in response to the condition being satisfied, update the profile and store the updated profile in association with the content and the rule into the blockchain by the chain code.

According to another embodiment of the present invention, there is provided a computer program product. The computer program product comprises a computer readable storage medium having program instructions embodied therewith, the program instructions executable by a processor to cause the processor to obtain content and a rule, the rule specifying a condition associated with the content and an action to be performed if the condition is satisfied; determine, at least based on the rule, a profile for recording a result of the action, instructions for monitoring whether the condition is satisfied and for updating the profile, and chain code for operating a blockchain; and in response to the condition being satisfied, update the profile and store the updated profile in association with the content and the rule into the blockchain by the chain code.

It is to be understood that the Summary is not intended to identify key or essential features of embodiments of the present disclosure, nor is it intended to be used to limit the scope of the present disclosure. Other features of the present disclosure will become easily comprehensible through the description below.

DETAILED DESCRIPTION

Figure 1:
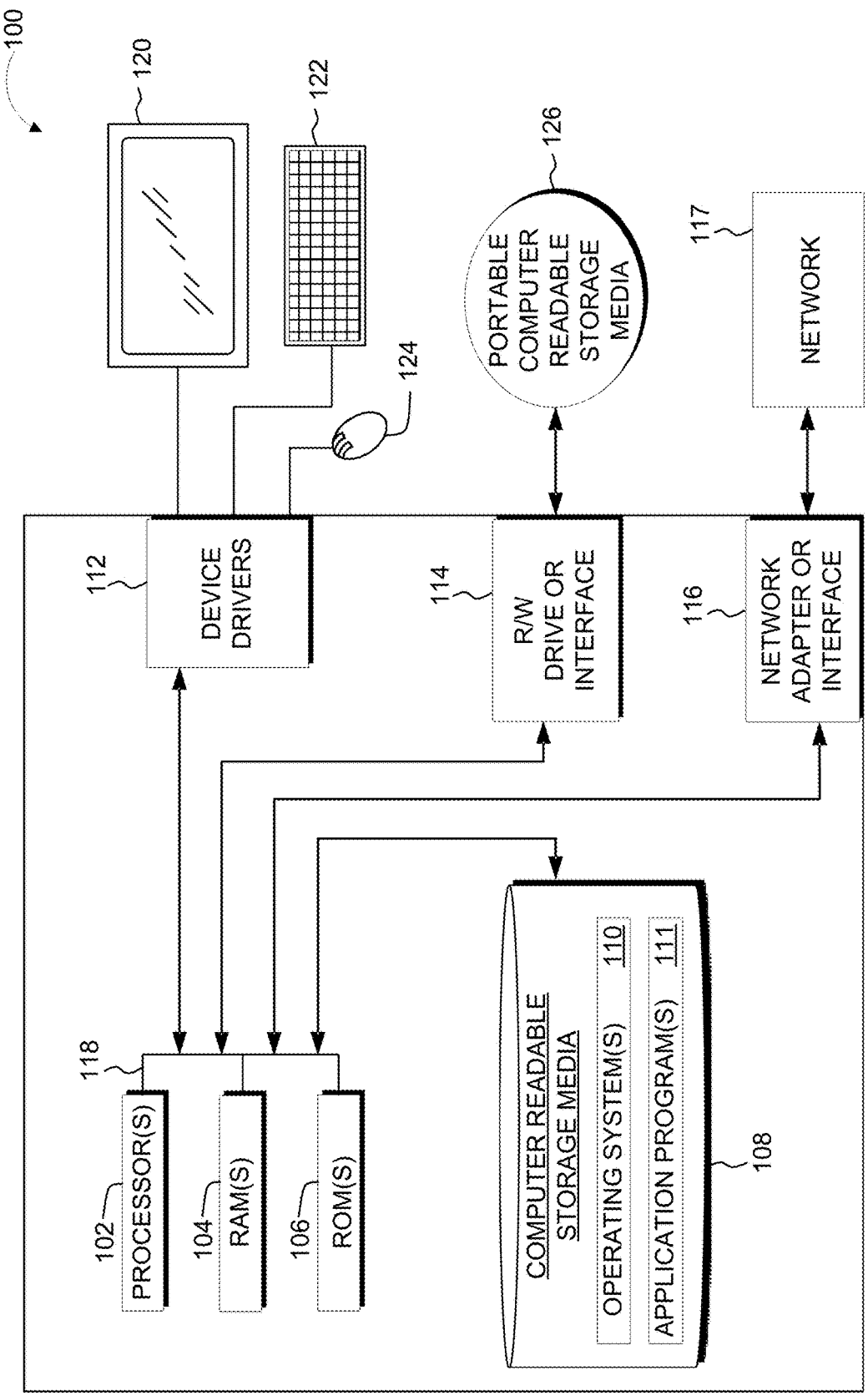
FIG. 1 depicts a cloud computing node according to an embodiment of the present invention.

Embodiments of the present invention relate to the field of computing, and more particularly to data processing. The following described exemplary embodiments provide a system, method, and program product to, among other things, allow for the controlling and tracing of objects across different parties. Therefore, the present embodiment has the capacity to improve the technical field of data processing by determining and updating profiles in association with content and rules in blockchain chain code.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Moreover, it is to be understood that in the context of the present disclosure, the terms "first," "second," "third" and the like are used to indicate individual elements or components, without suggesting any limitation as to the order of these elements. Further, unless otherwise indicated, a first element may or may not be the same as a second element. Other definitions, explicit and implicit, may be included below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider is computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove. It should be appreciated that FIG. 1 provides only an illustration of one implementation and does not imply any limitations with regard to the environments in which different embodiments may be implemented. Many modifications to the depicted environment may be made.

Cloud computing node 100 may include one or more processors 102, one or more computer-readable RAMs 104, one or more computer-readable ROMs 106, one or more computer readable storage media 108, device drivers 112, read/write drive or interface 114, network adapter or interface 116, all interconnected over a communications fabric 118. Communications fabric 118 may be implemented with any architecture designed for passing data and/or control information between processors (such as microprocessors, communications and network processors, etc.), system memory, peripheral devices, and any other hardware components within a system.

One or more operating systems 110 and one or more application programs 111 are stored on one or more of the computer readable storage media 108 for execution by one or more of the processors 102 via one or more of the respective RAMs 104 (which typically include cache memory). In the illustrated embodiment, each of the computer readable storage media 108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Cloud computing node 100 may also include an R/W drive or interface 114 to read from and write to one or more portable computer readable storage media 126. Application programs 111 on cloud computing node 100 may be stored on one or more of the portable computer readable storage media 126, read via the respective R/W drive or interface 114 and loaded into the respective computer readable storage media 108.

Cloud computing node 100 may also include a network adapter or interface 116, such as a TCP/IP adapter card or wireless communication adapter (such as a 4G wireless communication adapter using OFDMA technology) for connection to a network 128. Application programs 111 on cloud computing node 100 may be downloaded to the computing device from an external computer or external storage device via a network (for example, the Internet, a local area network or other wide area network or wireless network) and network adapter or interface 116. From the network adapter or interface 116, the programs may be loaded onto computer readable storage media 108. The network may comprise copper wires, optical fibers, wireless transmission, routers, firewalls, switches, gateway computers and/or edge servers.

Cloud computing node 100 may also include a display screen 120, a keyboard or keypad 122, and a computer mouse or touchpad 124. Device drivers 112 interface to display screen 120 for imaging, to keyboard or keypad 122, to computer mouse or touchpad 124, and/or to display screen 120 for pressure sensing of alphanumeric character entry and user selections. The device drivers 112, R/W drive or interface 114 and network adapter or interface 116 may comprise hardware and software (stored on computer readable storage media 108 and/or ROM 106).

Cloud computing node 100 may be a laptop computer, tablet computer, netbook computer, personal computer (PC), a desktop computer, a smart phone, or any programmable electronic device capable of communication, via network 117, with various components and devices.

Network 230 can be, for example, a local area network (LAN), a wide area network (WAN) such as the Internet, or a combination of the two, and can include wired, wireless, or fiber optic connections. In general, network 230 can be any combination of connections and protocols that will support communications between server 110 and client devices 104, 106, and 108.

Figure 2:
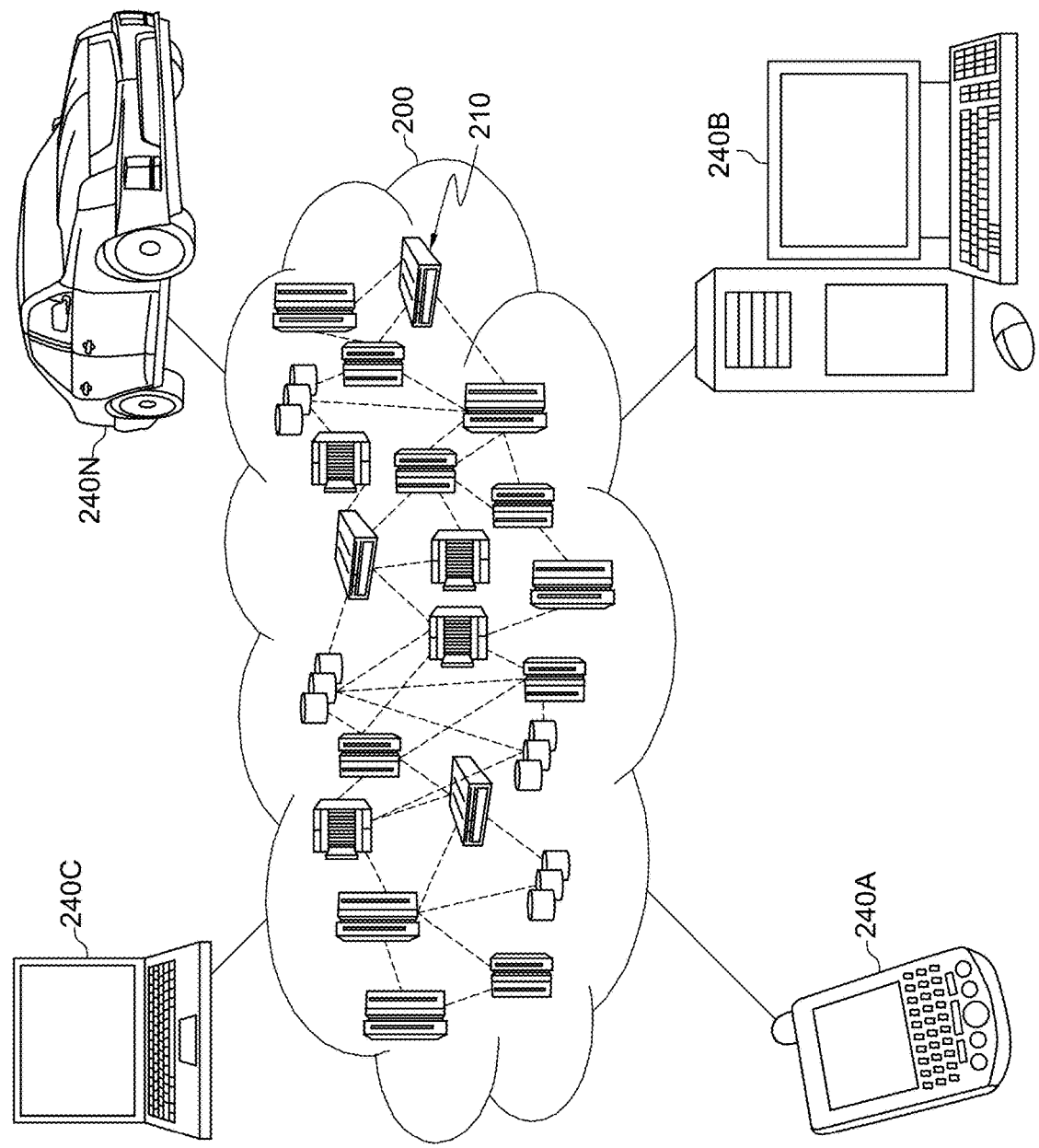
FIG. 2 depicts a cloud computing environment according to an embodiment of the present invention.

Referring now to FIG. 2, illustrative cloud computing environment 200 is depicted. As shown, cloud computing environment 200 comprises one or more cloud computing nodes 210 with which local computing devices used by cloud consumers, such as, for example, personal digital assistant (PDA) or cellular telephone 240A, desktop computer 240B, laptop computer 240C, and/or automobile computer system 230N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 240A-N shown in FIG. 2 are intended to be illustrative only and that computing nodes 210 and cloud computing environment 200 can communicate with any type of computerized device over any type of network and/or network addressable connection (e.g., using a web browser).

Figure 3:
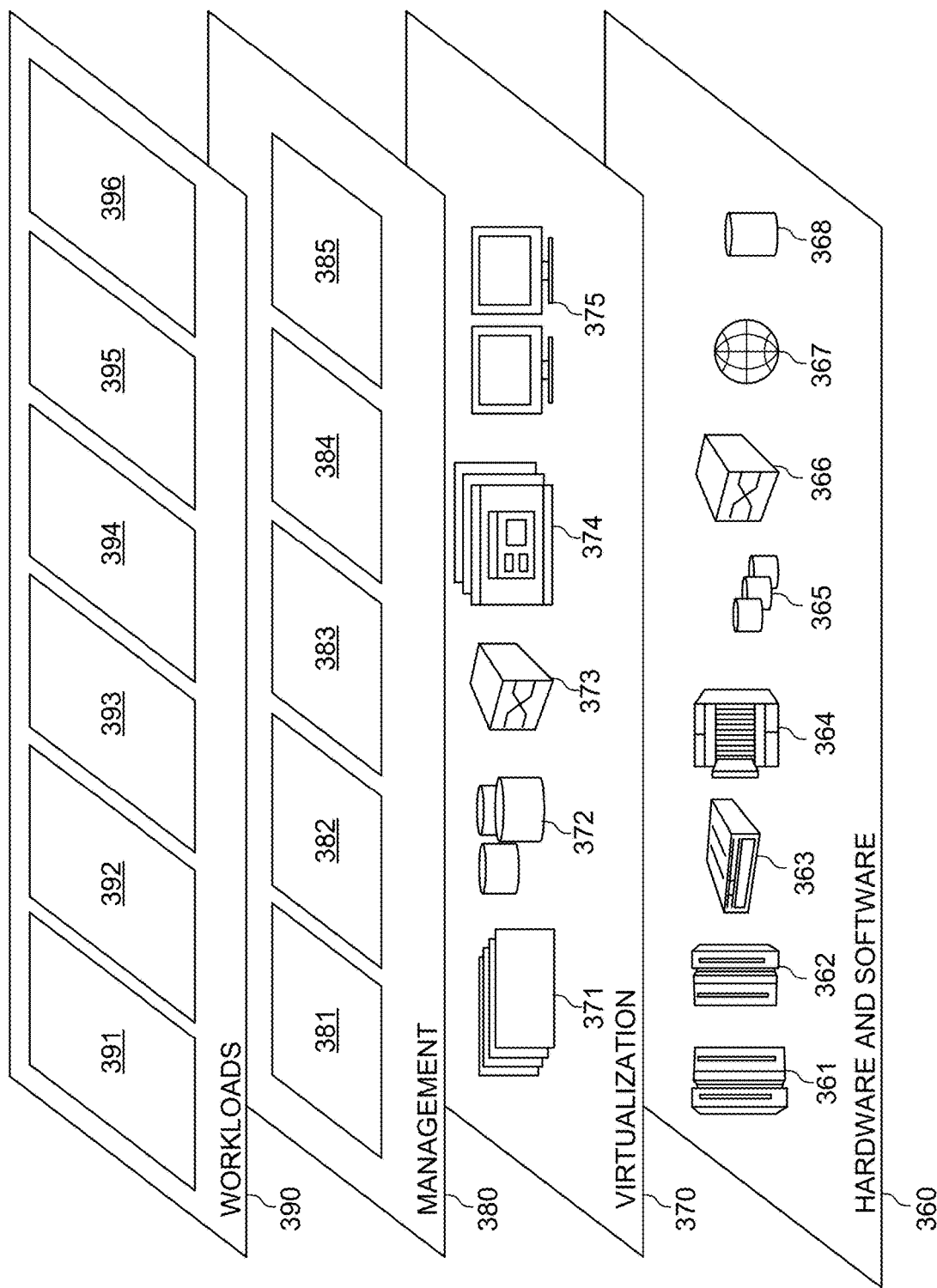
FIG. 3 depicts abstraction model layers according to an embodiment of the present invention.

Referring now to FIG. 3, a set of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions that may be provided from this layer include mapping and navigation 391, software development and lifecycle management 392, virtual classroom education delivery 393, data analytics processing 394, transaction processing 395, and rule based processing 396. In the rule based processing 396, content and a rule are obtained. The rule is customized and specifies a condition associated with the content and an action to be performed if the condition is satisfied. A profile, instructions and chain code are determined at least based on the rule. The profile is used for recording a result of the action. The instructions are used for monitoring whether the condition is satisfied and for updating the profile. The chain code is used for operating a blockchain on a second server. In response to the condition being satisfied, the profile is updated and the updated profile is stored in association with the content and the rule into the blockchain by the chain code.

Conventionally, as mentioned above, a party such as an organization, company, individual, and the like may not be able to dynamically and easily control how objects are transferred among different parties. As used herein, objects may refer to any digital information representing documents, goods, assets, or the like. For example, a webpage owner would like to build a highly engaging webpage, in which the owner can dynamically share digital content to a webpage visitor who contributes a command to the webpage. In this way, the owner would like to ensure that the digital content is indeed being shared as intended.

However, the traditional data management systems generally cannot allow a party to, dynamically and easily, control the objects, since each party maintains and controls its own data management system of different data format and schema or the like. In this case, the owner has to specify how the digital content can be shared to the visitor for each of the data management system, which takes significantly long time and great effort. As such, it is almost impossible for the owner to, dynamically, change the rule related to sharing the digital content in consideration of time and complexity.

Additionally, the party may not be able to, reliably and indisputably, trace how the objects are transferred among different parties. For example, the visitor would like to keep track of the digital content that he has been given. The visitor would like to ensure that the digital content remain unchanged. However, the traditional data management systems generally cannot allow a party to, reliably and indisputably, keep track of the objects. Since each party maintains and controls its own data management system, any of the data management system being tampered will lead to an inconsistency among different parties.

Furthermore, the party may also not be able to immediately learn that the objects are transferred. For example, the visitor would like to visit a highly engaging webpage, in which the visitor can immediately learn that the digital content is shared to him when he adds a comment to the webpage content. However, the traditional data management systems generally cannot allow a party to immediately update the state of the objects, since such update is not performed on the party's side.

In order to solve, at least in part, the above and other potential problems, according to embodiments of the present disclosure, a new approach for controlling and tracing objects across different parties is proposed.

Figure 4:
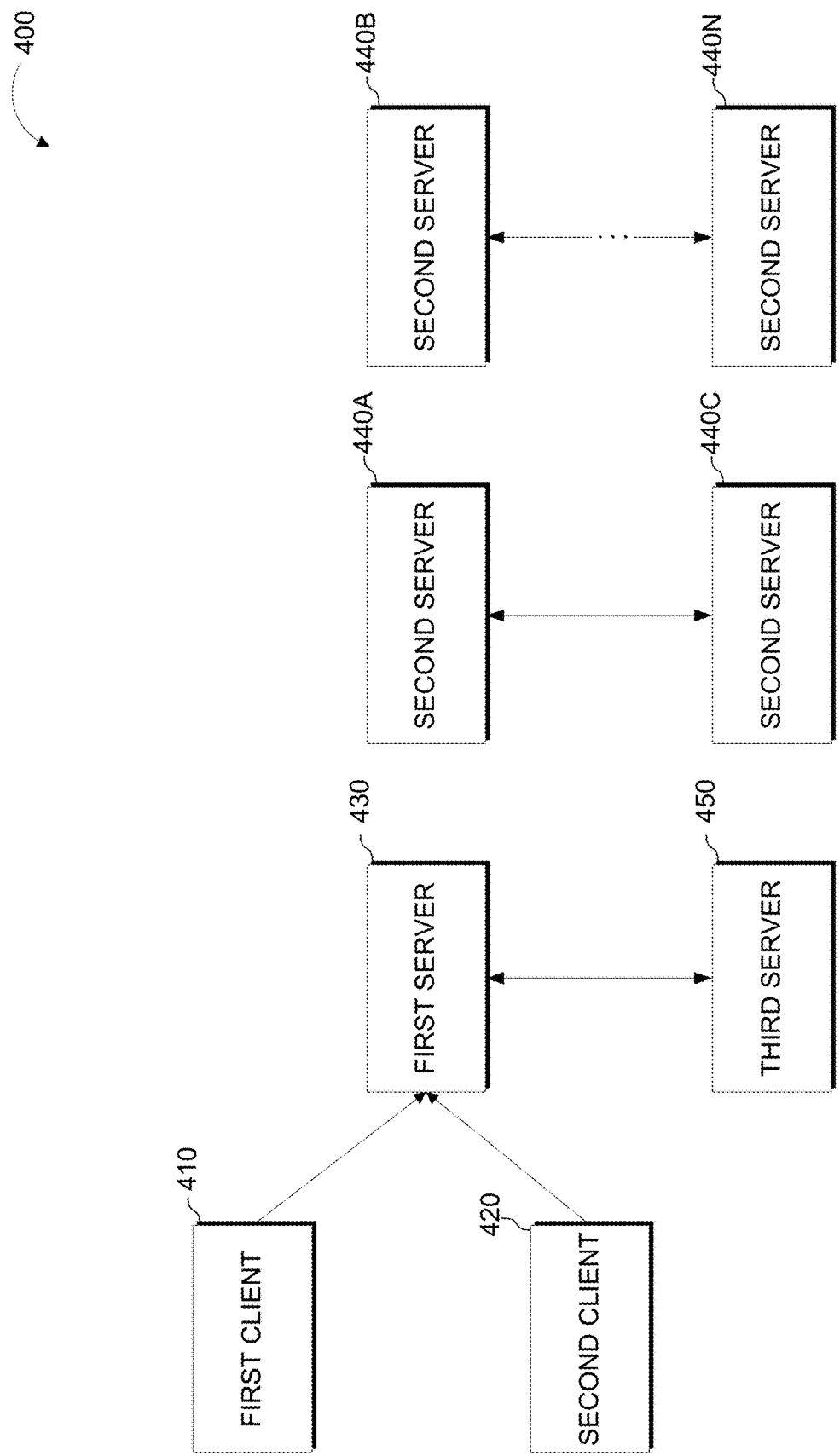
FIG. 4 is a schematic diagram of a data management system in accordance with embodiments of the present disclosure.

With reference now to FIG. 4, FIG. 4 shows a schematic diagram of a data management system 400 in accordance with embodiments of the present disclosure. The data management system 400 may include a first client 410, at least one second client 420, a first server 430, a plurality of second servers 440A-440N (collectively referred to as the second server 440), where N represents an integer, and a third server 450.

The first client 410 may provide content and a rule to the first server 430. The rule may be customized by the first client 410 and specify a condition associated with the content and an action to be performed if the condition is satisfied. For example, a webpage owner may upload a webpage containing webpage content and a rule from the first client 410 to the first server 430. The rule may, for example, specify that 10 experience points will be given to a webpage visitor of the second client 420 who adds a comment to the webpage content. In some embodiments, the rule can be dynamically changed. For example, the rule may be dynamically changed to specify that 20 experience points will be given to a webpage visitor of the second client 420 who adds a comment to the webpage content. Alternatively, the content and the rule may be obtained on the first server 430 per se without being provided from the first client 410. For example, the owner may edit the webpage directly on the first server 430.

The first server 430 may preprocess the rule to determine a profile for recording a result of the action, instructions for monitoring whether the condition is satisfied and for updating the profile, and chain code for operating a blockchain on the second server 440. In some embodiments, the instructions may also be used for rendering the profile. For example, the profile may record the experience points of the visitor of the second client 420. The instructions may monitor whether the visitor adds a comment, and update the profile by adding 10 experience points to the current experience points of the visitor.

The first server 430 may provide the content to the second client 420. Optionally, in some embodiments, the first server 430 may provide the profile to the second client 420. It is to be understood that the profile does not need to be provided to the second client 420 in the case that the first server 430 notifies the second client 420 of the experience points in other ways, for example, by text message or the like. Alternatively, or in addition, in some embodiments, the first server 430 may provide the instructions to the second client 420. The instructions are for monitoring whether the condition is satisfied and for rendering and/or updating the profile on the second client 420. In response to obtaining an indication, from the instructions either on the first server 430 or on the second client 420, that the condition is satisfied, the first server 430 may update the profile on the first server 430. For example, in response to obtaining an indication that the visitor of the second client 420 has added a comment to the webpage content, the first server 430 may update the profile on the first server 430 by adding 10 experience points to the current experience points of the visitor. Additionally, the first server 430 may store the updated profile in association with the content and the rule into the blockchain on the second server 440 by the chain code. In some embodiments, the first server 430 may provide the updated profile to the second client 420.

In some embodiments, the first server 430 may provide the result of the action to the third server 450 for further analysis, optionally, in response to obtaining the further analysis from the third server 450, provide the further analysis to the second client 420. For example, the first server 430 may notify the third server 450 that 10 experience points is given to the visitor of the second client 420. The first server 430, when obtaining a rank according to the experience points of the visitor from the third server 450, may provide the rank to the second client 420.

In some embodiments, the first server 430 may verify whether the action can be performed. If the action can be performed, the first server 430 may update the profile and store the updated profile in association with the content and the rule into the blockchain on the second server 440 by the chain code. For example, the owner may have a predetermined limitation for experience points that can be given to a specified number of visitors. For instance, the owner may have 50 experience points limitation, and can only give 10 experience points to each of 5 visitors. The first server 430 may verify whether the specified number has been reached. If not, the owner can give 10 experience points to the visitor. In this case, the first server 430 may update the profile by adding 10 experience points to the current experience points of the visitor of the second client 420, and store the updated profile, the updated content where a comment has been added by the visitor, and the current rule into the blockchain. If the specified number has been reached, the first server 430 may notify the first client 410 and/or the second client 420 that the profile is unable to be updated.

The second client 420 may render the content and the profile (if any) received from the first server 430. In some embodiments, the second client 420 may render the profile by the instructions, which also received, from the first server 430. In some embodiments, the second client 420 may monitor whether the condition is satisfied by the instructions received from the first server 430. If the second client 420 determines that the condition is satisfied, it may update the profile on the second client 420. For example, if the second client 420 determines that the condition, the visitor of the second client 420 adds a comment, is satisfied, the second client 420 may update the profile by adding 10 experience points to the current experience points of the visitor. Additionally, the second client 420 may provide an indication that the condition is satisfied to the first server 430. In some embodiments, and in addition, the second client 420 may provide the updated profile to the first server 430. Alternatively, the second client 420 may only provide the indication to the first server 430 without updating the profile on the second client 420. As another alternative, the second client 420 may receive the updated profile from the first server 430.

The second server 440 may use a blockchain. For example, the second server 440 may be a validating peer server of the blockchain. In some embodiments, the plurality of second servers 440A-440N may maintain a ledger, respectively. The ledger is discussed with respect to FIG. 5.

Figure 5:
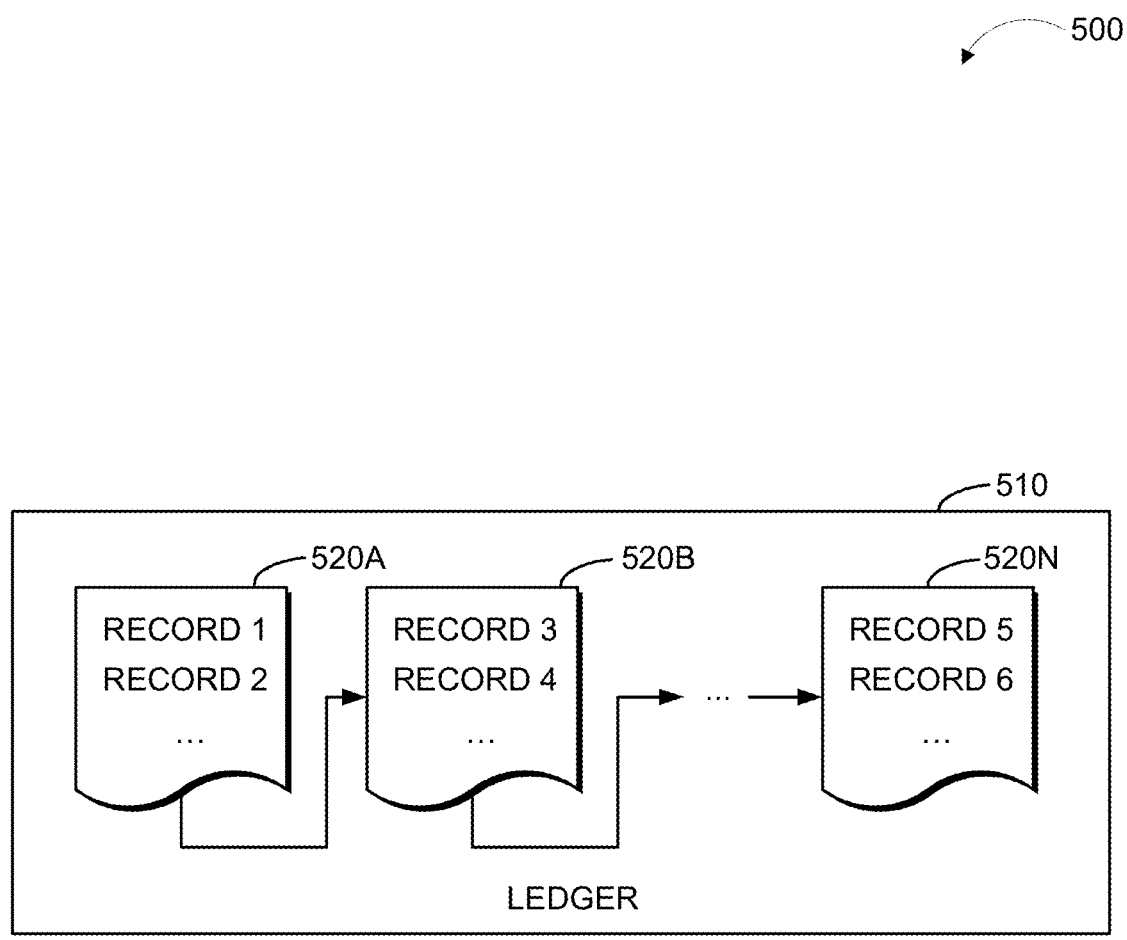
FIG. 5 is a schematic diagram of a blockchain in accordance with embodiments of the present disclosure.

FIG. 5 is a schematic diagram of a blockchain 500 in accordance with embodiments of the present disclosure. The blockchain 500 includes a ledger 510 that contains a plurality of blocks 520A-520N. In some embodiments, the blocks may be cryptographically connected one by one. The blocks may include a signature, and the signature of one block depends on the signatures and records of the preceding blocks. For example, the signature of one block may be computed from the hash value of the signatures and records of the preceding blocks. It would be appreciated that the records in the blocks are immutable, since any modification to a record in a certain block will influence the subsequent blocks.

In accordance with embodiments of the present disclosure, the second server 440 may verify whether the action can be performed, instead of performing the verification by the first server 430 as described above. If the action can be performed, the second server 440 may run validation and consensus algorithm to create a new record containing the updated profile, the content and the rule in the ledgers of the blockchain. For example, the owner may have a predetermined limitation for experience points that can be given to a specified number of visitors. For instance, the owner may have a 50 experience points limitation, and can only give 10 experience points to each of 5 visitors. The second server 440 may verify whether the specified number has been reached. If not, the owner can give 10 experience points to the visitor. In this case, the second server 440 may create a new record containing the updated profile where the current experience points of the visitor of the second client 420 has been added by 10 experience points, the updated content where a comment has been added by the visitor, and the current rule. If the specified number has been reached, the second server 440 may notify the first server 430 that the profile is unable to be updated.

In accordance with embodiments of the present disclosure, in comparison with the conventional data management system, the data management system 400 can dynamically control and indisputably trace how objects are transferred among different parties. Additionally, the data management system 400 can immediately reflect that the objects are transferred. As a result, the data management system 400 achieves high performance and user experience with short time and low complexity.

Figure 6:
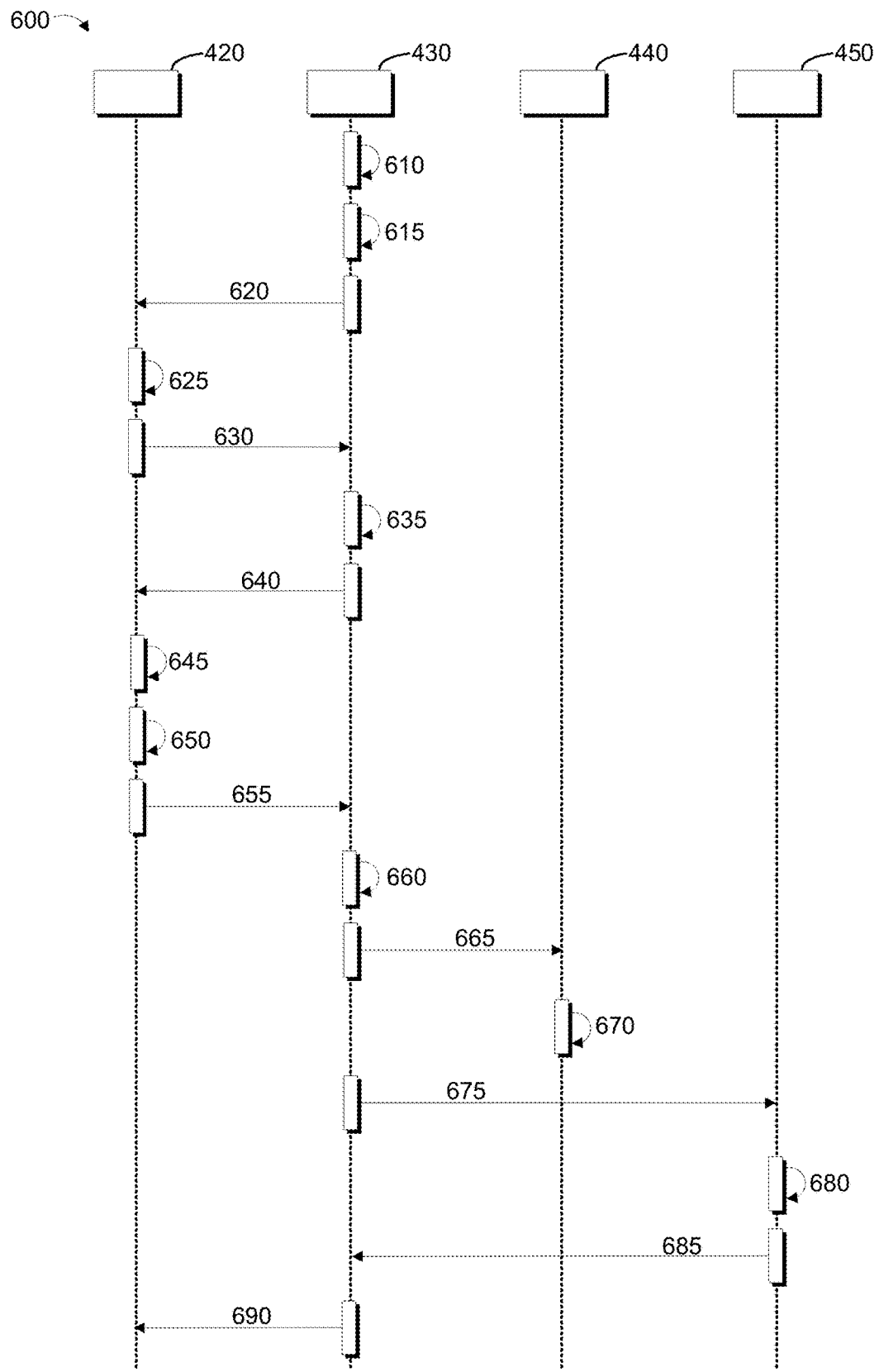
FIG. 6 is a swim lane diagram of a data processing method in accordance with embodiments of the present disclosure.

FIG. 6 is a swim lane diagram of a data processing method 600 in accordance with embodiments of the present disclosure. The method 600 may be implemented in the data management system 400 as shown in FIG. 4.

The first server 430 obtains content and a rule, at 610. In some embodiments, the content and rule may be provided from the first client 410, and thus the rule may be customized by the first client 410. Alternatively, the content and rule may be obtained on the first server 430 per se, and in this case, the rule may be customized on first server 430. The content may be rendered on the second client 420. For example, the content may be a webpage content. The rule specifies a condition associated with the content and an action to be performed if the condition is satisfied. For example, the rule may specify that 10 experience points will be given to a webpage visitor who adds a comment to the webpage content. The rule may be implemented in any suitable formats. For example, in some embodiments, the rule may include executable code written by any suitable programming language and/or script language. Alternatively, or in addition, the rule may be described in a formatted text such as Extensive Markup Language (XML) text or a plaintext.

The first server 430 determines a profile, instructions and chain code at least based on the rule, at 615. The profile may be used for recording a result of the action. The profile may be, but not limited to, HTML code. The instructions may be used for monitoring whether the condition is satisfied and for updating the profile. In some embodiments, the instructions may be used for rendering the profile. The instructions may be, but not limited to, a script, such as a script written in JavaScript code. The chain code may be used for operating the blockchain on the second server 440. For example, the profile may record the experience points of the visitor of the second client 420. The instructions may monitor whether the visitor adds a comment, and update the profile by adding 10 experience points to the current experience points of the visitor when detecting that the visitor has added a comment.

In some embodiments, since the records regarding the profile may be stored in the blockchain on the second server 440, the instructions may set the profile based on the latest record regarding the profile stored in the blockchain on the second server 440. For example, the instructions may obtain the current state of the profile from the blockchain to set the profile, such as setting the current experience points of the profile of the visitor of the second client 420 to the same as the obtained experience points of the profile. In some embodiments, the instructions may set the profile with predefined initial values that may be specified by the first server 430, for example.

In some embodiments, the first server 430 may be connected to the third server 450 for generating further analysis to the result of the action. Various types of the third servers 450 can be used. In this case, the first server 430 may determine the type of the third server 450 and determine the profile, the instructions and the chain code further based on the type of the third server. For example, different types of the third server 450 may employ different mechanisms, such as different application program interfaces (APIs) and/or data formats. Determine the profile, the instructions and the chain code based on the type of the third server may enable the profile, the instructions, and the chain code to handle information provided by the third server 450. As such, the rule can be adapted to various types of the third server 450. In this way, for example, the result of the further analysis provided by the third server 450 can be included in the profile.

In some embodiments, the third server 450 may provide a code segment for generating further analysis on the result of the action. In this case, the instructions may also obtain and provide the code segment to the second client 420 and/or the first server 430. For example, the instructions may upload the code segment from the third server 450 into the profile of the second client 420 and/or the first server 430 to facilitate updating the profile. In this case, result of the further analysis may be included in the profile of the second client 420 and/or the first server 430. In one embodiment, the code segment may facilitate updating the profile in the first server 430, and then the first server 430 may provide the updated profile to the second client 420. In this way, certain functions defined by the code segment can be offloaded from the third server 450 to the second client 420 and/or the first server 430. Alternatively, the instructions may obtain the code segment without providing it to the second client 420 and/or the first server 430.

The first server 430 provides the content to the second client 420, at 620. In some embodiments, the first server 430 may also provide the instructions and/or the profile to the second client 420. The communication between the first server 430 and the second client 420 may be based on, for example, HTTP protocol.

The second client 420 renders the content and the profile (if any) when receiving the content and the profile from the first server 430, at 625. In some embodiments, the second client 420 may render the profile by the instructions received. In the case that the code segment is provided to the second client 420, the second client also performs rendering based on the code segment.

Figure 7A:
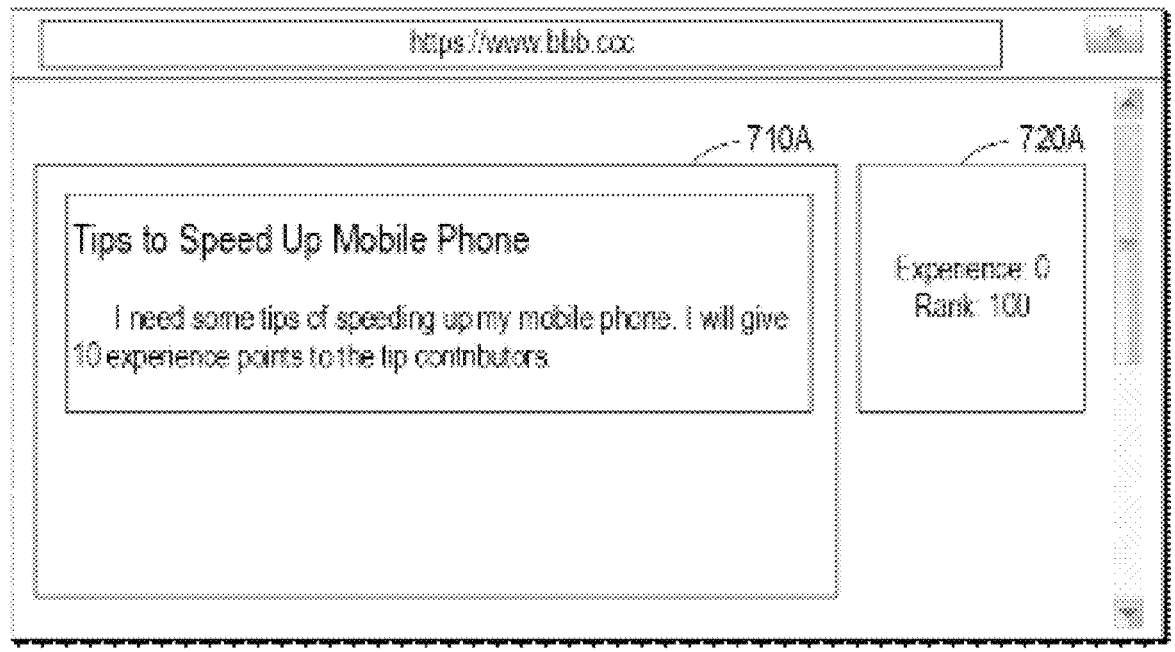
FIG. 7A is a schematic diagram of a webpage in accordance with embodiments of the present disclosure.

For the purpose of clarification, the rendered content and profile are discussed with respect to FIG. 7A, which shows an example webpage 700A in accordance with embodiments of the present disclosure. As shown in FIG. 7A, the webpage content is rendered into the content element 710A, and the profile is rendered into the profile element 720A for example by the instructions. At this stage, no comment has been added to the content element 710A, and the profile element 720A shows that 0 experience point is given to the webpage visitor of the second client 420 and the rank of the visitor is 100.

Referring back to FIG. 6, when the second client 420 is to update at least a part of the content, the second client 420 provides a request to update at least a part of the content to the first server 430, at 630. For example, when the visitor of the second client 420 adds a comment to the webpage content, the second client 420 may provide a request to add the comment to the webpage content to the first server 430.

In response to receiving the request, the first server 430 causes the part of the content to be updated, at 635, and provides the updated part of the content to the second client 420, at 640. For example, the first server 430 may update the webpage content by adding the comment to the webpage content, and provide the newly added comment to the second client 420.

In response to receiving the updated part of the content from the first server 430, the second client 420 renders the updated part of the content, at 645. If the instructions on the second client 420 monitor that the condition is satisfied, the instructions update the profile (if any), 650. Additionally, in the case that the code segment for generating further analysis to the result of the action is provided to the second client 420, the profile may also be updated by the code segment. For example, if the instructions on the second client 420 monitor that the condition, the visitor of the second client 420 adds a comment to the webpage content, is satisfied, the instructions update the profile by adding 10 experience points to the current experience points of the visitor. In addition, in the case that the code segment is inserted into the profile, the rank of the visitor according to the current experience points of the visitor is determined.

Figure 7B:
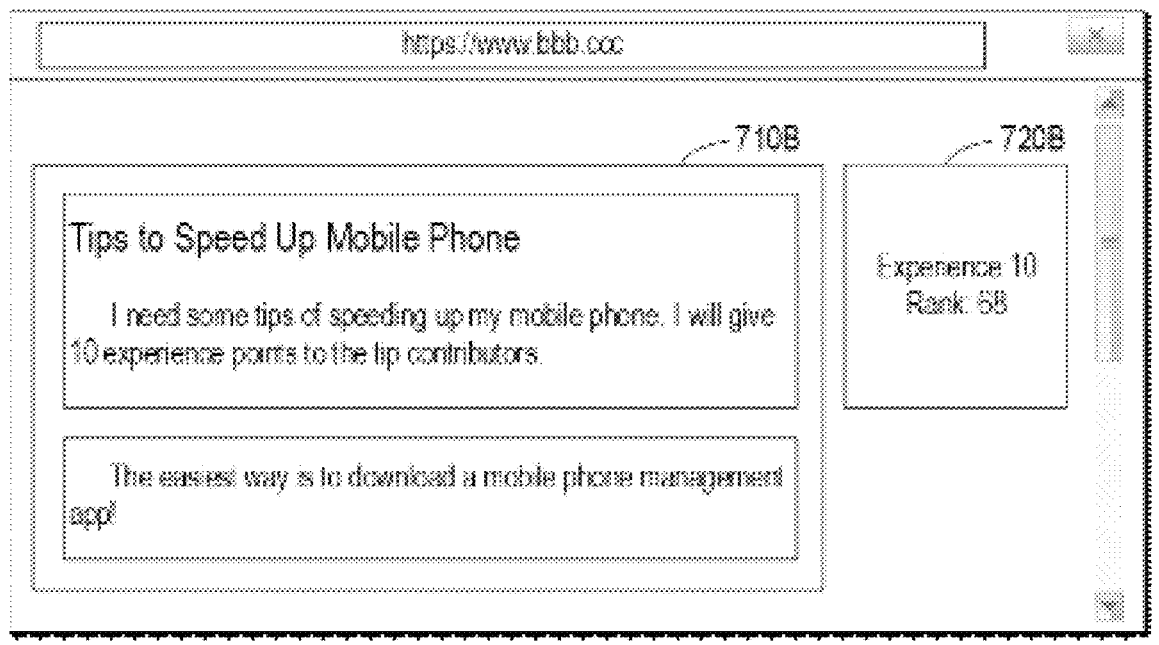
FIG. 7B is a schematic diagram of an updated webpage in accordance with embodiments of the present disclosure.

The newly rendered content and profile are discussed with respect to FIG. 7B, which shows an example updated webpage 700B in accordance with embodiments of the present disclosure. As shown in FIG. 7B, the content is rendered into the content element 710B, and the profile is rendered into the profile element 720B. At this stage, a comment has been added to the content element 710B, and the profile element 720B shows that the 10 experience points has been given to the webpage visitor of the second client 420, and the rank of the visitor has been increased to 68.

Referring back to FIG. 6, the instructions on the second client 420 provide an indication that the condition is satisfied to the first server 430, at 655. In response to obtaining an indication that the condition is satisfied, the first server 430 updates the profile on the first server 430, at 660. For example, the first server 430 updates the profile by adding 10 experience points to the current experience points of the visitor of the second client 420 stored on the first server 430.

The first server 430 provides the updated profile, the content and the rule to the second server 440 by the chain code, at 665. The second server 440 stores the updated profile in association with the content and the rule into the blockchain, at 670. For example, the second server 440 may create a new record containing the updated profile where the current experience points of the visitor of the second client 420 has been added by 10 experience points, the updated content where a comment has been added by the visitor, and the current rule, and store the record into the blockchain.

In some embodiments, the first server 430 may provide the content, the instructions and the profile to other clients. In this case, the first server 430 may provide the updated profile to the other clients for updating the profile rendered on the other clients. For example, when a visitor of the second client 420 opens a webpage on two different browsers, the profile of one browser may be updated by its local instructions. The profile of another browser may wait to receive the updated profile from the first server 430.

In some embodiments, the first server 430 provides the result of the action to the third server 450, at 675. The third server 450 generates further analysis to the result of the action, at 680. For example, the third server 450 may rank the visitors based on the experience points possessed by the respective visitor. In this case, the third server 450 may increase the ranking of the visitor for the increase of the experience points.

In some embodiments, the third server 450 provides the further analysis to the first server 430, at 685. In response to obtaining the further analysis from the third server 450, the first server 430 provides the further analysis to the second client 420, at 690. For example, the first server 430 may provide the ranking of the visitor to second client 420 such as via HTTP PUT operations. Alternatively, the third server 450 may provide the further analysis to the second client 420. Additionally, the further analysis may be provided to other clients by the first server 430 or the third server 450.

In accordance with embodiments of the present disclosure, the method 600 can dynamically control and indisputably trace how objects are transferred among different parties, and immediately reflect that the objects are transferred.

Figure 8:
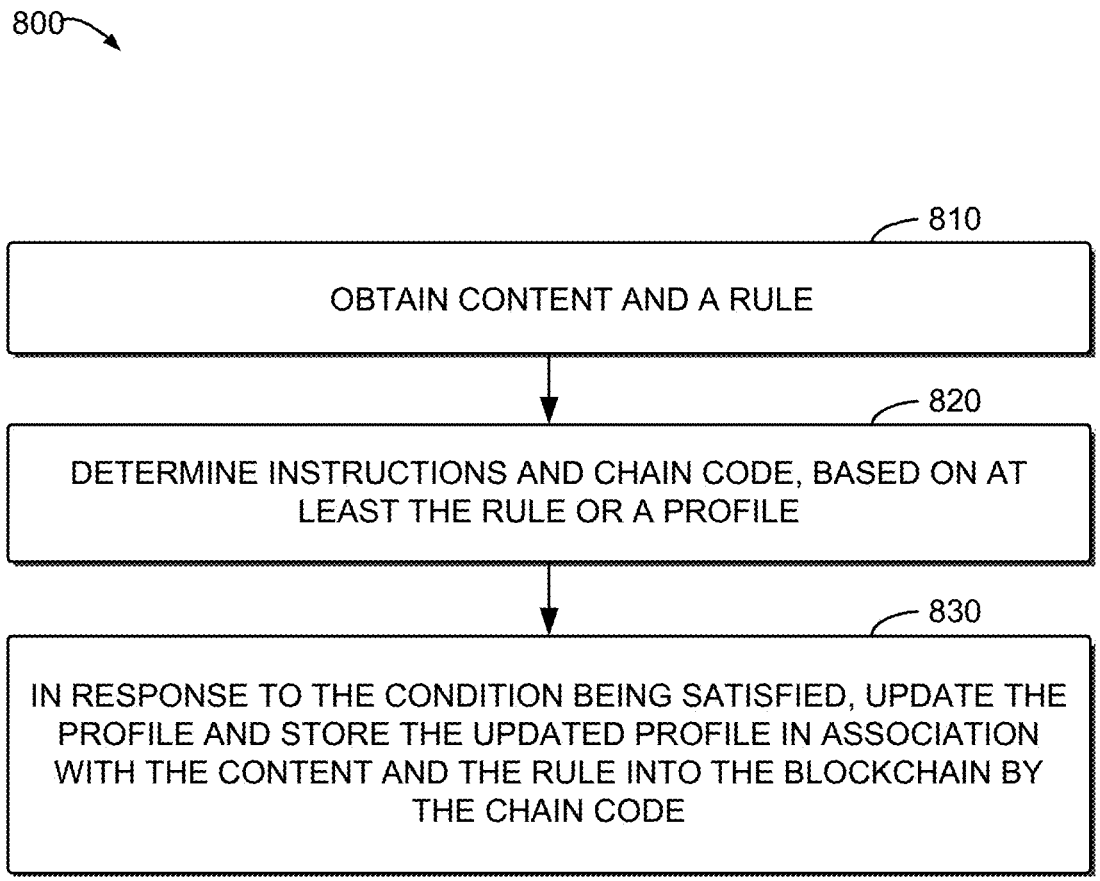
FIG. 8 is a flow chart of the method implemented in the first server in accordance with embodiments of the present disclosure.

FIG. 8 is a flow chart of the method 800 implemented in the first server in accordance with embodiments of the present disclosure. The method 800 may be implemented in the first server 430 as shown in FIG. 4. The method 800 is entered at 810, where content and a rule are obtained. The rule specifies a condition associated with the content and an action to be performed if the condition is satisfied.

At 820, a profile, instructions and chain code are determined at least based on the rule. The profile is used for recording a result of the action. The instructions are used for monitoring whether the condition is satisfied and for updating the profile. In some embodiments, the instructions are also used for rendering the profile. The chain code is used for operating a blockchain on the second server 440. At 830, in response to obtaining an indication that the condition is satisfied, the profile is updated and the updated profile is stored in association with the content and the rule into the blockchain by the chain code. In accordance with embodiments of the present disclosure, the method 800 can enable dynamical control and indisputable trace of objects transfer among different parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method comprising:
obtaining content and a rule, the rule specifying a condition associated with the content and an action to be performed if the condition is satisfied, wherein the rule is customized by one or the other of a first client and a server related to obtaining the rule;
determining, at least based on the rule, a profile for recording a result of the action, instructions for monitoring whether the condition is satisfied and for updating the profile, and chain code for operating a blockchain, wherein determining the profile, the instructions and the chain code further comprises:
determining a type of a further server for generating analysis to the result of the action, wherein the determined type includes an application programming interface (API) of the further server; and
determining the profile, the instructions, and the chain code further based on the type of the further server to enable handling of information provided by the further server;
obtaining, from the further server for generating analysis to the result of the action, a code segment for generating analysis to the result of the action;
providing the code segment to a second client;
inserting, by the second client, the provided code segment into the profile;
in response to the condition being satisfied, verifying that the action is permissible; and
in response to verifying the action is permissible, updating the profile based on the action and storing the updated profile in association with the content and the rule into the blockchain by the chain code.

2. The method of claim 1, further comprising:
providing the content, the instructions and the profile to a second client, wherein the content and the profile are to be rendered on the second client.

3. The method of claim 1, further comprising:
in response to receiving, from a second client, a request to update at least a part of the content, updating the part of the content; and
providing the updated part of the content to the second client.

4. The method of claim 2, further comprising:
providing the content, the instructions and the profile to a third client; and
providing the updated profile to the third client for updating the profile rendered on the third client.

5. The method of claim 1, further comprising:
providing the result of the action to a further server for generating analysis to the result of the action; and
in response to obtaining the analysis from the further server, providing the analysis to a second client.

6. A computer program product comprising:
one or more computer-readable storage media and program instructions stored on the one or more non-transitory computer-readable storage media, the program instructions comprising:
instructions to obtain content and a rule, the rule specifying a condition associated with the content and an action to be performed if the condition is satisfied, wherein the rule is customized by a first client or a server related to obtaining the rule;
instructions to determine, at least based on the rule, a profile for recording a result of the action, instructions for monitoring whether the condition is satisfied and for updating the profile, and chain code for operating a blockchain, wherein determining the profile, the instructions and the chain code further comprises:
determining a type of a further server for generating analysis to the result of the action, wherein the determined type includes an application programming interface (API) of the further server; and determining the profile, the instructions, and the chain code further based on the type of the further server to enable handling of information provided by the further server;

obtaining, from the further server for generating analysis to the result of the action, a code segment for generating analysis to the result of the action;

providing the code segment to a second client;

inserting, by the second client, the provided code segment into the profile;

in response to the condition being satisfied, verifying that the action is permissible; and in response to verifying the action is permissible, updating the profile based on the action and storing the updated profile in association with the content and the rule into the blockchain by the chain code.

7. The computer program product of claim 6, wherein the instructions further cause the processor to:

instructions to provide the content, the instructions and the profile to a second client, wherein the content and the profile are to be rendered on the second client.

8. The computer program product of claim 6, wherein the instructions further cause the processor to:

in response to instructions to receive, from a second client, a request to update at least a part of the content, instructions to update the part of the content; and instructions to provide the updated part of the content to the second client.

9. The computer program product of claim 7, wherein the instructions further cause the processor to:

instructions to provide the content, the instructions and the profile to a third client; and instructions to provide the updated profile to the third client for updating the profile rendered on the third client.

10. The computer program product of claim 6, further comprising:

instructions to provide the result of the action to a further server for generating analysis to the result of the action; and in response to instructions to obtain the analysis from the further server, instructions to provide the analysis to a second client.

11. A computer system comprising:

one or more computer processors;

one or more computer-readable storage media;

program instructions stored on the computer-readable storage media for execution by at least one of the one or more processors, the program instructions comprising:

instructions to obtain content and a rule, the rule specifying a condition associated with the content and an action to be performed if the condition is satisfied, wherein the rule is customized by a first client or a server related to obtaining the rule;

instructions to determine, at least based on the rule, a profile for recording a result of the action, instructions for monitoring whether the condition is satisfied and for updating the profile, and chain code for operating a blockchain, wherein determining the profile, the instructions and the chain code further comprises:

determining a type of a further server for generating analysis to the result of the action, wherein the determined type includes an application programming interface (API) of the further server; and determining the profile, the instructions, and the chain code further based on the type of the further server to enable handling of information provided by the further server;

instructions to obtain, from the further server for generating analysis to the result of the action, a code segment for generating analysis to the result of the action;

instructions to provide the code segment to a second client;

instructions to insert, by the second client, the provided code segment into the profile;

in response to the condition being satisfied, instructions to verify that the action is permissible; and in response to verifying the action is permissible, instructions to update the profile based on the action and storing the updated profile in association with the content and the rule into the blockchain by the chain code.

12. The system of claim 11, further comprising:

instructions to provide the content, the instructions and the profile to a second client, wherein the content and the profile are to be rendered on the second client.

13. The system of claim 11, further comprising:

in response to instructions to receive, from a second client, a request to update at least a part of the content, instructions to update the part of the content; and instructions to provide the updated part of the content to the second client.

* * * * *